United States Patent [19]

Schweitzer

[11] Patent Number: 4,616,906
[45] Date of Patent: Oct. 14, 1986

[54] ADJUSTMENT MECHANISM

[75] Inventor: David C. Schweitzer, Santa Barbara, Calif.

[73] Assignee: General Motor Corporation, Detroit, Mich.

[21] Appl. No.: 778,843

[22] Filed: Sep. 23, 1985

Related U.S. Application Data

[63] Continuation of Ser. No. 538,583, Oct. 3, 1983, abandoned.

[51] Int. Cl.⁴ .............................................. G02B 7/18
[52] U.S. Cl. ..................................... 350/486; 350/568
[58] Field of Search .............................. 350/486, 568

[56] References Cited

U.S. PATENT DOCUMENTS 2,212,346  8/1940  Kroon ................................ 350/568
4,210,385  7/1980  Baudot .
4,392,140  7/1983  Bastian et al. .
4,396,919  8/1983  Speicher .

OTHER PUBLICATIONS

Submitted by Applicant, Sketch Entitled "Gimbaled Sight Head".

Primary Examiner—John K. Corbin
Assistant Examiner—Rebecca D. Gass
Attorney, Agent, or Firm—Edward J. Biskup

[57] ABSTRACT

A mechanism supporting a device for movement about a horizontal axis and a vertical axis that includes a pair of swing arms which are mechanically interconnected for synchronous movement in opposite directions so as to cause the device to be adjustably positioned about the vertical axis.

8 Claims, 5 Drawing Figures

ADJUSTMENT MECHANISM

This is a continuation of application Ser. No. 538,583 filed on Oct. 3, 1983 now abandoned.

This invention concerns a mechanism for providing adjustable movement of an optical or other device about a pair of substantially perpendicular pivot axes.

More specifically, the mechanism according to the present invention is capable of reducing the profile of a sight head and eliminating the large and costly azimuth components normally employed with a gimbaled design. Broadly stated, the present mechanism consists of two cambered swing arms which contain and support an elevation axis of a device such as a mirror of a sight head. The arms are each supported by a small bearing set and are constrained by a pair of cables and appropriate pulleys to rotate synchronously in opposite directions relative to each other about a pair of inclined axes which may intersect at the elevation axis. The mechanism thus causes the mirror to rotate about an orthogonal axis which in this case is azimuth.

The objects of the present invention are to provide a new and improved mechanism for adjustably positioning a device about a pair of substantially perpendicular pivot axes and in which the pivotal movement about one of the pivot axes is achieved through a twist axis arrangement; to provide a new and improved dual axis sight director mechanism utilizing a pair of cambered swing arms located in a pair of intersecting planes and movable in opposite directions for providing azimuth motion of a mirror supported by the swing arms; to provide a new and improved twist axis mechanism having a pair of cambered swing arms which are interconnected by a cable and pulley system or other mechanical or servocontrolled arrangement for synchronously moving the arms in opposite directions about a pair of inclined intersecting axes; and to provide a new and improved twist axis sight head having a mirror supported for movement about a horizontal axis by the lower ends of a pair of arms, the upper ends of which are supported by bearings for pivotal movement about a pair of inclined intersecting axes so when the arms are moved in opposite directions about the inclined axes, the mirror is positioned about a substantially vertical axis.

Other objects and advantages of the present invention will be more apparent from the following detailed description when taken with the drawings in which.

Figure 1:
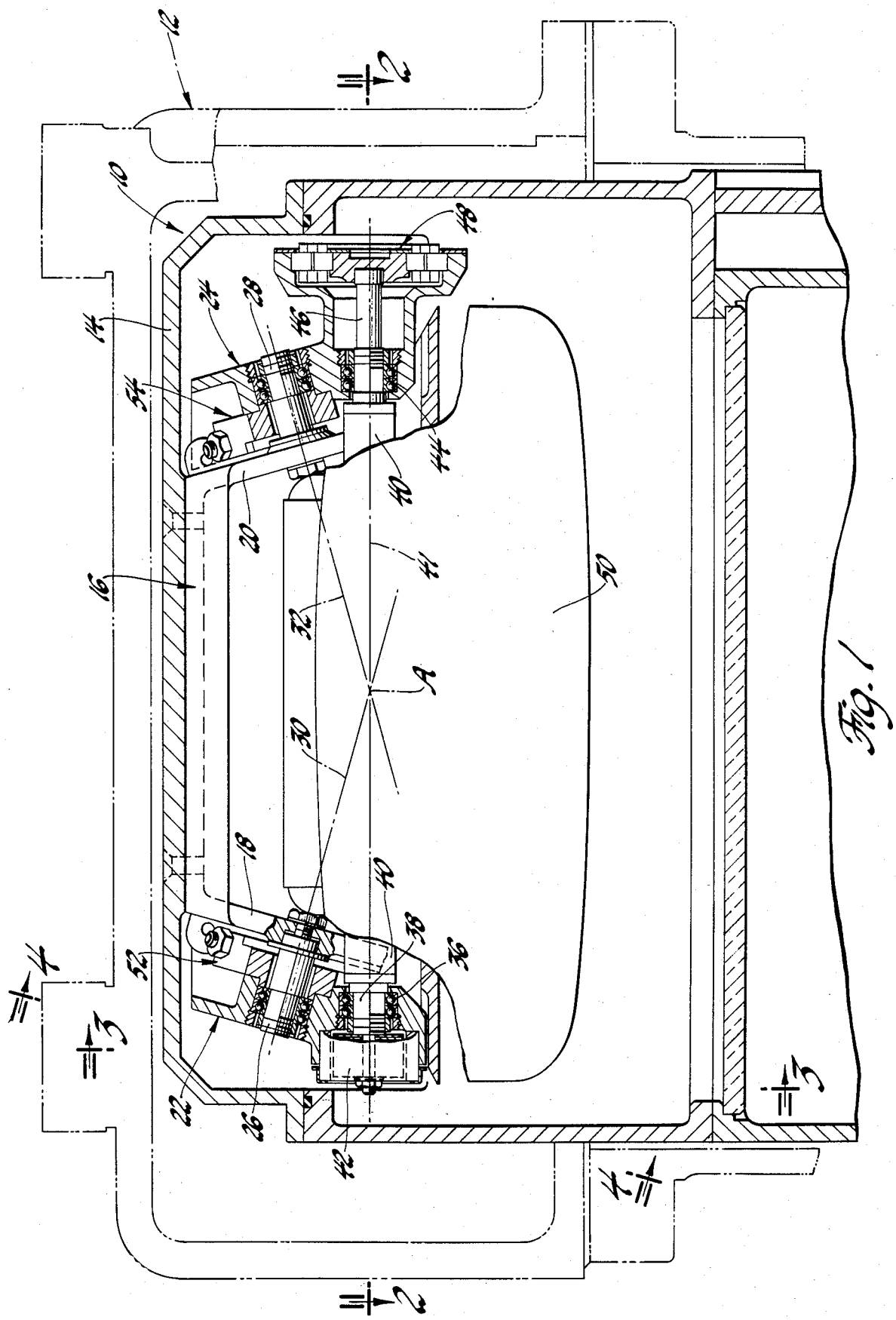
FIG. 1 is a partially sectioned elevational view of a sight head employing a mechanism made in accordance with the present invention.
Figure 2:
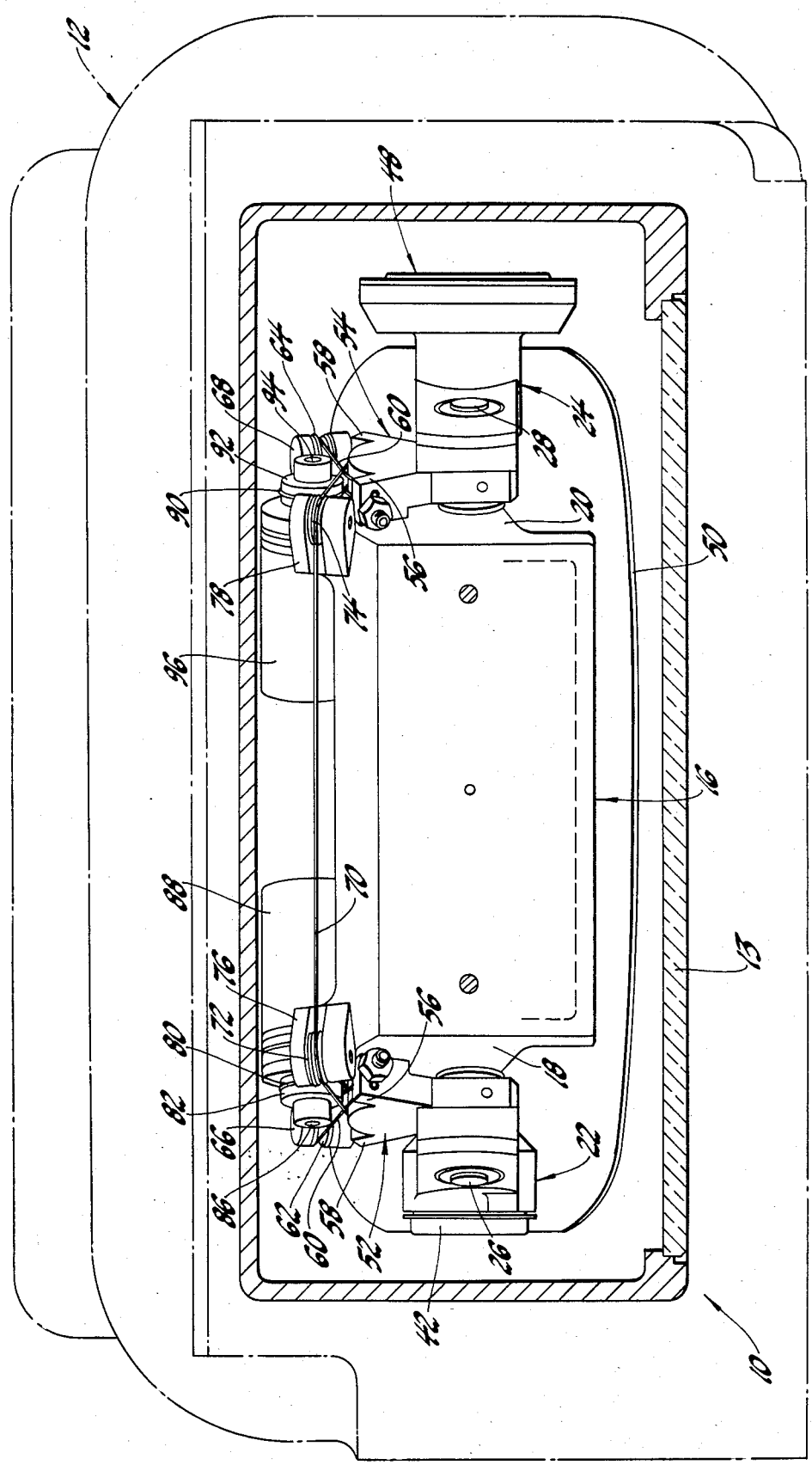
FIG. 2 is a plan view of the sight head taken on lines 2—2 of FIG. 1.

Referring now to the drawings and more particularly FIGS. 1 and 2 thereof, the mechanism according to the present invention is shown in the form of a sight head 10 located within the usual armor shield 12 having an armor cover which opens to expose a window 13 within a support housing 14. The mechanism includes the support housing 14 the top portion of which supports a yoke member 16 formed with a pair of depending legs 18 and 20 located in diverging planes which intersect above the shield 12. A pair of cambered swing arms 22 and 24 have their upper ends connected to the legs 18 and 20 by pivotal connections 26 and 28, respectively. The pivotal connections 26 and 28 allow the swing arms 22 and 24 to pivot about inclined axes 30 and 32, respectively, which intersect at a point A located substantially midway between the legs 18 and 20 as seen in FIG. 1.

The lower end of the swing arm 22 carries a bearing assembly 36 which rotatably supports one end 38 of a horizontally oriented shaft 40, the longitudinal center axis 41 of which passes through the point A. A permanent magnet DC servomotor 42 mounted in swing arm 22, is drivingly connected to the end 38 of the horizontally oriented shaft 40. The lower end of the swing arm 24 similarly carries a bearing assembly 44 which, in this case, supports the other end 46 of the shaft 40. A position sensor in the form of a resolver 48 is also carried by the lower end of the swing arm 24 and is connected to the other end 46 of shaft 40. An optical device in the form of a mirror 50 is rigidly secured to the shaft 40 and is adapted to be rotated by the servomotor 42 about the axis 41 between the positions shown in phantom lines in FIG. 3 with its position about that axis being sensed by resolver 48.

Figure 3:
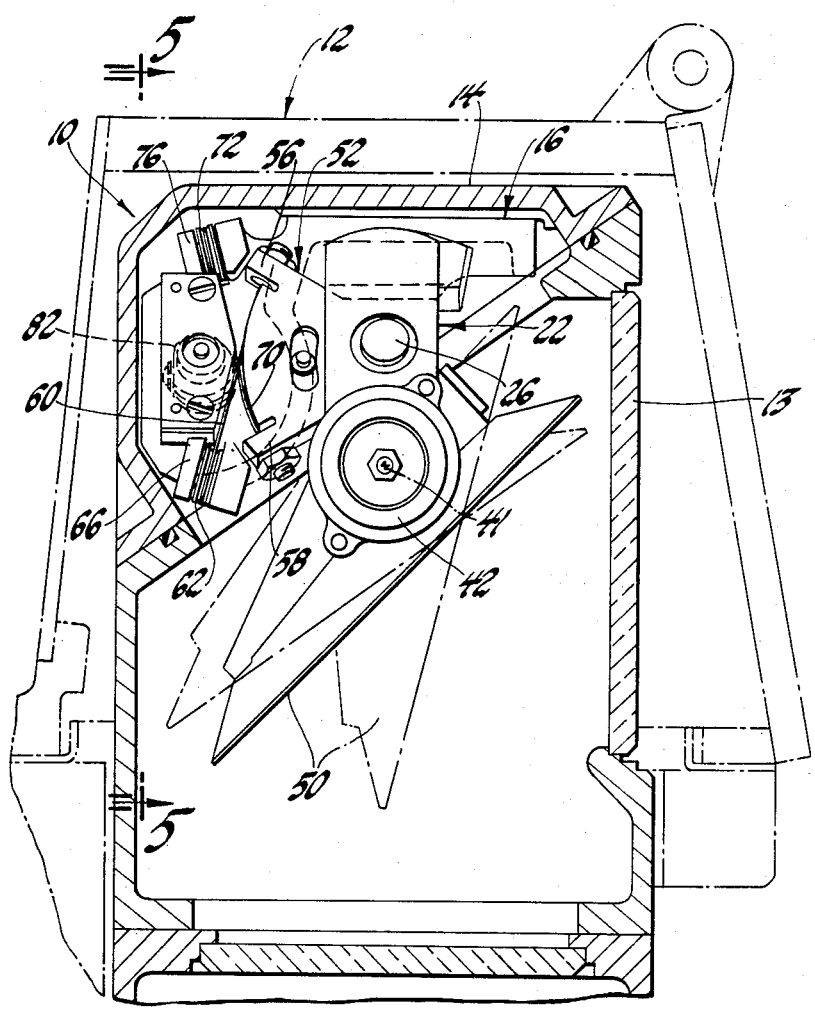
FIG. 3 is a side elevational view of the sight head taken on line 3—3 of FIG. 1.
Figure 4:
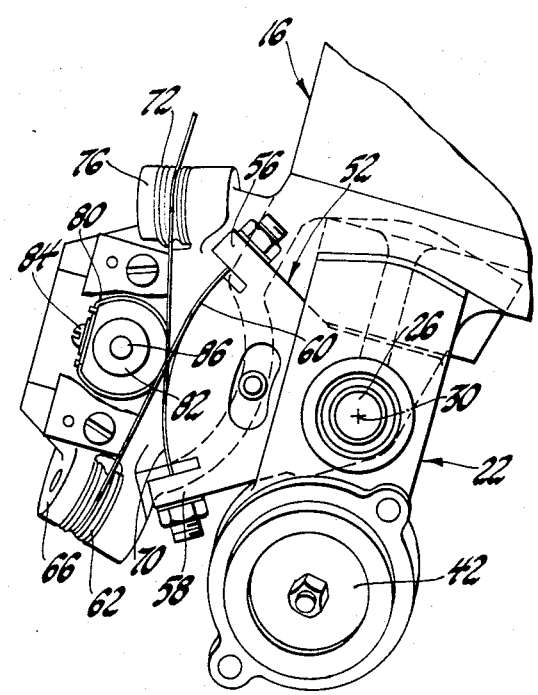
FIG. 4 is an enlarged view taken on line 4—4 of FIG. 1 of one of the cambered swing arms incorporated in the sight head.

As best seen in FIGS. 2, 3 and 4, the swing arms 22 and 24 are rigidly fastened to rearwardly extending and generally triangularly shaped control members 52 and 54, respectively, each of which is formed with a pair of angularly spaced ears 56 and 58 located on a circle having the center axis 30 or 32 of the associated pivotal connection, as the case may be, as its center. The ear 56 of the control member 52 secured to swing arm 22 is fixed to one end of a cable 60 which is entrained about a pair of idler pulleys 62 and 64 rotatably supported by bracket members 66 and 68, respectively, rigidly formed on the yoke member 16. The other end of the cable 60 is fixed to the upper ear 56 of the control member 54 of the swing arm 24. A second cable 70 has one end fixed to the lower end 58 of the control member 52 of swing arm 22 and is entrained about idler pulleys 72 and 74 which are rotatably supported by bracket members 76 and 78, respectively, also rigidly formed on the yoke member 16. The other end of cable 70 is fixed to the ear 58 of the control member 54.

Figure 5:
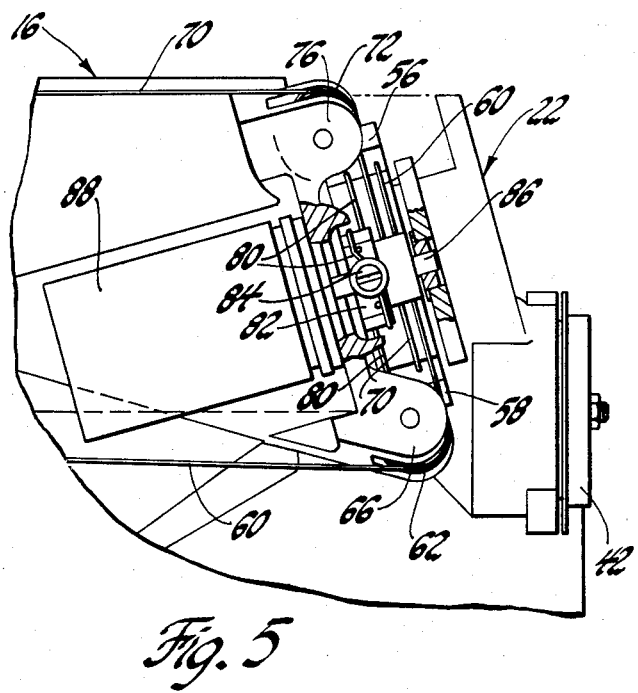
FIG. 5 is a fragmentary enlarged view taken on lines 5—5 of FIG. 3 illustrating the cable connection between the drive pulley and one of the control members which forms a part of the present invention.

As seen in FIGS. 2, 4 and 5, a drive cable 80 is wound about and fixed to a drive pulley 82 by a screw 84 and has its opposite ends fixed to the ears 56 and 58 of the control member 52. As best seen in FIG. 5, the drive pulley 82 is fixed to the output shaft 86 of a DC servomotor 88. A similar cable arrangement is provided adjacent the swing arm 24 which, in this case, consists of a driven cable 90 wound about and secured to a driven pulley 92 secured to the input shaft 94 of a resolver 96. The opposite ends of the driven pulley 92 are connected to the ears 56 and 58 of the control member 54 in the same manner as described in connection with the drive cable 80 associated with the drive pulley 82.

The cable arrangement described above serves to pivot the swing arms 22 and 24 synchronously in opposite directions about the pivotal connections 26 and 28, so as to rotate the shaft 40 about a substantially vertical axis passing through point A and provide adjustment of the mirror 50 about such axis. In this regard, it will be noted that, as seen in FIG. 4, when the motor 88 rotates the drive pulley 82 in a clockwise direction, the ear 56 of the connected swing arm 22 is pivoted about the pivotal connection 26 in a counterclockwise direction. The counterclockwise movement of the control member 52 acts through the cable 70 (which has its other end connected to the lower ear 58 of the control member 54) to cause the ear 58 of control member 54 to be raised about the pivotal connection 28 a distance equal to the distance that the ear 58 of the control member 52 is lowered. As a result, the lower end of the swing arm 24 pivots synchronously in the opposite direction causing the rotation of the shaft 40 and the mirror 50 about the aforesaid vertical axis. Also, due to the interconnection of the control member 54 with the driven pulley 92 through the cable 90, the input shaft 94 of the resolver 96 is rotated the same amount as the drive pulley 82 and, as is conventional, generates a signal representing the position of the mirror 50 about the substantially vertical axis.

It, of course, should be apparent that if the drive pulley 82, as seen in FIG. 4, is rotated by the motor 88 in a counterclockwise direction a predetermined distance, the cable 80 acts on the lower ear 58 of the control member 52 to raise the latter upwardly about the pivotal connection 26 causing the swing arm 22 to pivot clockwise about the axis 30. At the same time, and due to the cable 60, the ear 56 of the control member 54 is pulled downwardly causing the lower end of the swing arm 24 to pivot forwardly about axis 32 a distance equal to the aforementioned predetermined distance.

Thus, from the above description, it will be understood that adjustable movement of the mirror 50 about the horizontal axis 41 is realized by energizing the motor 42 while movement of the mirror 50 about the substantially vertical axis passing through point A is attained by energizing the motor 88. In this manner, the mechanism 10 provides two axes of freedom in a very compact and mechanically simple package. In addition, it will be noted that the rotation of the shaft 40 about the substantially vertical axis is realized by having the opposite ends of the shaft 40 supported by bearing assemblies which provide compliance when the swing arms 22 and 24 are pivoted in opposite directions. Although such movement of the shaft 40 about a substantially vertical axis may be limited, the bearing assemblies 36 and 44 should provide sufficient compliance to allow useful shaft movement left and right in azimuth.

Various changes and modifications can be made in this construction without departing from the spirit of the invention. Such changes and modifications are contemplated by the inventor and he does not wish to be limited except by the scope of the appended claims.

The embodiments of the invention in which an exclusive property or privilege is claimed are defined as follows:

1. A mechanism for supporting a device and providing adjustable movement thereof about a pair of substantially perpendicular pivot axes, said mechanism including a yoke having a pair of laterally spaced legs, said legs supporting a pair of swing arms for pivotal movement about a pair of inclined axes, bearing means mounted in each of said swing arms for supporting said device for pivotal movement about one of said pivot axes, and means connecting said swing arms to each other for providing synchronous movement of said swing arms in opposite directions about said inclined axes so as to rotate said device and provide adjustable movement thereof about the other of said pivot axes.

2. A mechanism for supporting a device and providing adjustable movement thereof about a pair of substantially perpendicular pivot axes, said mechanism including a yoke having a pair of laterally spaced legs, said legs supporting a pair of swing arms for pivotal movement about a pair of inclined axes which intersect at a point located substantially midway between said legs of said yoke, bearing means mounted in each of said swing arms for supporting said device for pivotal movement about one of said pivot axes, and means connecting said swing arms to each other for providing synchronous movement of said swing arms in opposite directions about said inclined axes so as to rotate said device and provide adjustable movement thereof about the other of said pivot axes.

3. A mechanism for supporting an optical device and providing adjustable movement thereof about a pair of substantially perpendicular pivot axes, said mechanism including a yoke having a pair of laterally spaced legs, said legs supporting a pair of swing arms for pivotal movement about a pair of inclined axes which intersect at a point located substantially midway between said legs of said yoke, bearing means mounted in each of said swing arms for supporting said optical device for pivotal movement about one of said pivot axes, a pair of identical control members, one of said control members rigidly connected to one of said swing arms and the other of said control members rigidly connected to the other of said swing arms, and cable means interconnecting the control members of said swing arms to each other for providing synchronous movement of said swing arms in opposite directions about said inclined axes so as to rotate said optical device and provide adjustable movement thereof about the other of said pivot axes.

4. The mechanism set forth in claim 3 wherein each of said control members is formed with a pair of angularly spaced ears and said cable means includes a pair of cables which interconnect the corresponding ears of said control members to each other.

5. The mechanism of claim 3 wherein a first actuator and a first position sensor are carried by said legs for causing said optical device to pivot about one of said pair of substantially perpendicular pivot axis, and a second actuator and a second position sensor is carried by said yoke and connected to said swing arms for providing adjustable movement of said optical device about the other of said pair of substantially perpendicular pivot axes.

6. The mechanism of claim 5 wherein said first and second actuators in each instance is an electric motor and wherein said first and second position sensors in each instance is an electromechanical device.

7. A mechanism for supporting an optical device and providing adjustable movement thereof about a substantially vertical axis and a substantially horizontal axis, said mechanism including a yoke having a pair of laterally spaced legs, said legs supporting the upper portions of a pair of swing arms for pivotal movement about a pair of inclined axes which intersect at a point located substantially midway between said legs of said yoke, bearing means mounted in the lower portion of each of said swing arms for supporting said optical device for pivotal movement about said horizontal axis, cable means connecting said swing arms to each other for providing synchronous movement of said swing arms in opposite directions about said inclined axes so as to rotate said optical device and provide adjustable movement thereof about said vertical axis, a first actuator and a first position sensor carried by said legs for causing said optical device to pivot about said horizontal axis and generate a signal representing the position of said optical device about said horizontal axis, and a second actuator and a second position sensor carried by said yoke, said second actuator being connected to one of said swing arms for causing movement of said one of said swing arms in one direction about its inclined axis so that said cable means causes the other of said swing arms to move in a direction opposite to said one direction and results in said optical device moving about said vertical axis and said second position sensor generates a signal representing the position of said optical device about said vertical axis.

8. The mechanism set forth in claim 7 wherein said first and second actuators in each instance is an electric motor and wherein said first and second position sensors in each instance is an electromechanical device.

* * * * *